(12) United States Patent
Chen et al.

(10) Patent No.: US 12,512,934 B2
(45) Date of Patent: Dec. 30, 2025

(54) HANDLING CRS INTERFERENCE IN DYNAMIC SPECTRUM SHARING

(71) Applicant: QUALCOMM Incorporated, San Diego, CA (US)

(72) Inventors: Bo Chen, Beijing (CN); Wentao Zhang, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/017,555

(22) PCT Filed: Sep. 4, 2020

(86) PCT No.: PCT/CN2020/113580
§ 371 (c)(1),
(2) Date: Jan. 23, 2023

(87) PCT Pub. No.: WO2022/047747
PCT Pub. Date: Mar. 10, 2022

(65) Prior Publication Data
US 2023/0299899 A1    Sep. 21, 2023

(51) Int. Cl.
*H04L 5/00*    (2006.01)
(52) U.S. Cl.
CPC .......... *H04L 5/0035* (2013.01); *H04L 5/0048* (2013.01)
(58) Field of Classification Search
CPC .......................... H04L 5/0035; H04L 5/0048
See application file for complete search history.

(56) References Cited

U.S. PATENT DOCUMENTS

| 2015/0358855 A1 | 12/2015 | Yang et al. |
| 2017/0230985 A1 | 8/2017 | Yamada et al. |

(Continued)

FOREIGN PATENT DOCUMENTS

| CN | 103581073 A | 2/2014 |
| CN | 105191174 A | 12/2015 |

(Continued)

OTHER PUBLICATIONS

Intel Corporation: "Discussion on Enhanced CRS-IM Network Assistance Framework", 3GPP TSG-RAN WG4 Meeting #82, R4-1701746, Athens, Greece, Feb. 13, 2017-Feb. 17, 2017, pp. 1-3, Feb. 17, 2017 (Feb. 17, 2017) the whole document.

(Continued)

*Primary Examiner* — Joseph A Bednash
(74) *Attorney, Agent, or Firm* — Procopio, Cory, Hargreaves & Savitch LLP/Qualcomm

(57) ABSTRACT

The present disclosure relates to methods and devices for wireless communication including an apparatus, e.g., a UE and/or a base station. In one aspect, the apparatus may transmit an interference indication associated with DSS, the interference indication corresponding to a capability of a CRS interference cancellation. The apparatus may also receive CRS assistance information associated with the DSS, the CRS assistance information corresponding to one or more interfering cells. Additionally, the apparatus may determine at least one of a location or a sequence of at least one CRS, the at least one CRS corresponding to at least one of the one or more interfering cells. The apparatus may also mitigate interference from the at least one CRS corresponding to the at least one interfering cell, the interference being mitigated based on at least one of the location or the sequence of the at least one CRS.

19 Claims, 10 Drawing Sheets

(56) References Cited

U.S. PATENT DOCUMENTS

2018/0254797 A1 9/2018 Amini et al.
2021/0067261 A1 3/2021 Shin et al.

FOREIGN PATENT DOCUMENTS

| KR | 20220015702 A | * | 2/2022 |
| WO | 2013141541 A1 | | 9/2013 |
| WO | 2018070853 A1 | | 4/2018 |
| WO | WO-2022025557 A1 | * | 2/2022 |

OTHER PUBLICATIONS

International Search Report and Written Opinion—PCT/CN2020/113580—ISA/EPO—May 27, 2021.
Nokia Siemens Networks: "MBSFN-SubframeConfigList in CRS-AssistanceInfo", 3GPP TSG-RAN WG2 Meeting #81bis, R2-131419, Chicago, USA, Apr. 15, 2013-Apr. 19, 2013, 6 Pages, Apr. 19, 2013 (Apr. 19, 2013) the whole document.
Supplementary European Search Report—EP20951991—Search Authority—Munich—Apr. 29, 2024.
Ericsson: "Remaining issues for Rel-16 maintenance and TEI", Tdoc R1-2000986, 3GPP TSG-RAN WG1 Meeting #100-e, Online, Feb. 24-Mar. 6, 2020, 4 Pages.
Moderator (Ericsson): "Summary of NR Dynamic spectrum sharing (DSS) in Email discussion [102-e-NR-DSS-DC_enh2-01]", R1-2007442, 3GPP TSG-RAN WG1 #102-e, eMeeting, Aug. 17-28, 2020, pp. 1-24.
NTT DOCOMO, Inc: "Output summary on NR Rel-16 TEI after RAN1#100-e preparation phase", R1-2001155, 3GPP TSG RAN WG1 #100-e, e-Meeting, Feb. 24-Mar. 6, 2020, pp. 1-17.
NTT DOCOMO, Inc: "Summary on NR Rel-16 TEI related discussion", R1-2000931, 3GPP TSG RAN WG1 #100-e, e-Meeting, Feb. 24-Mar. 6, 2020, pp. 1-14.

* cited by examiner

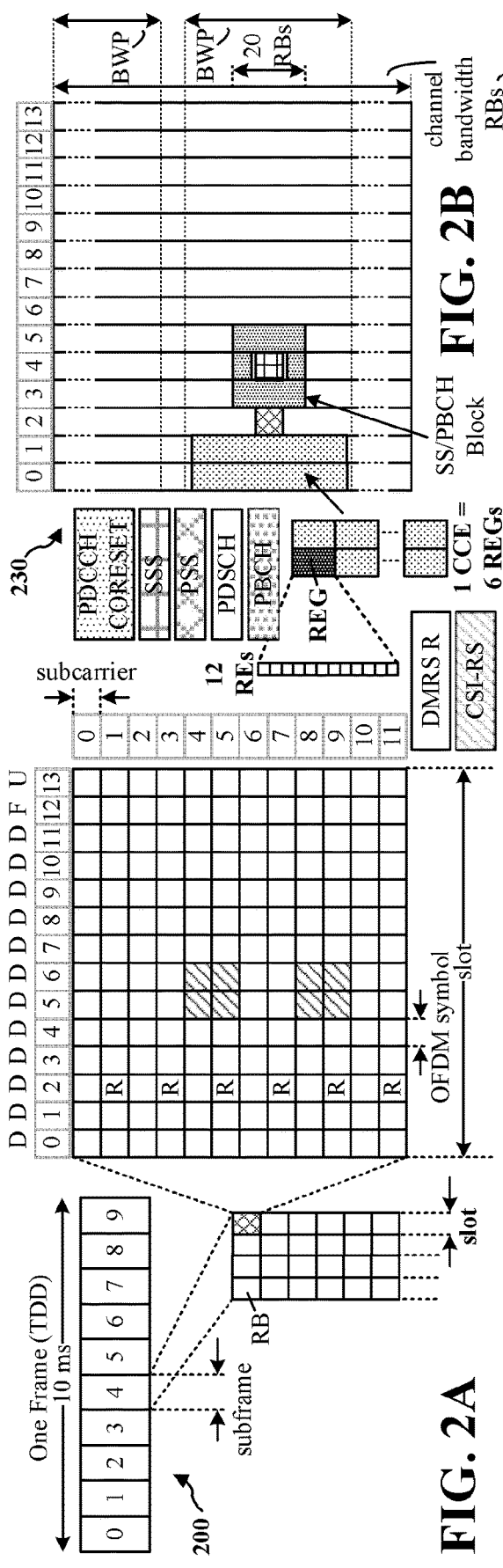
FIG. 2A
FIG. 2B
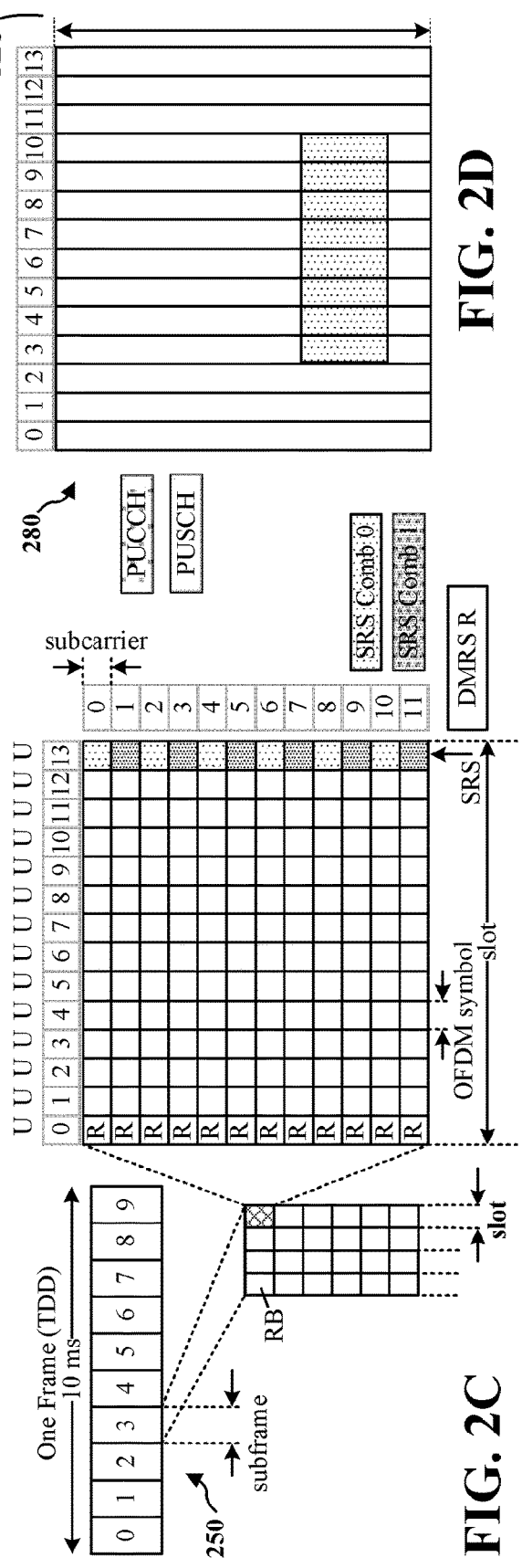
FIG. 2C
FIG. 2D

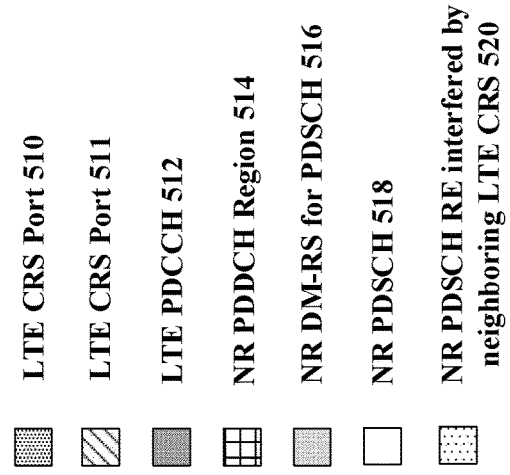
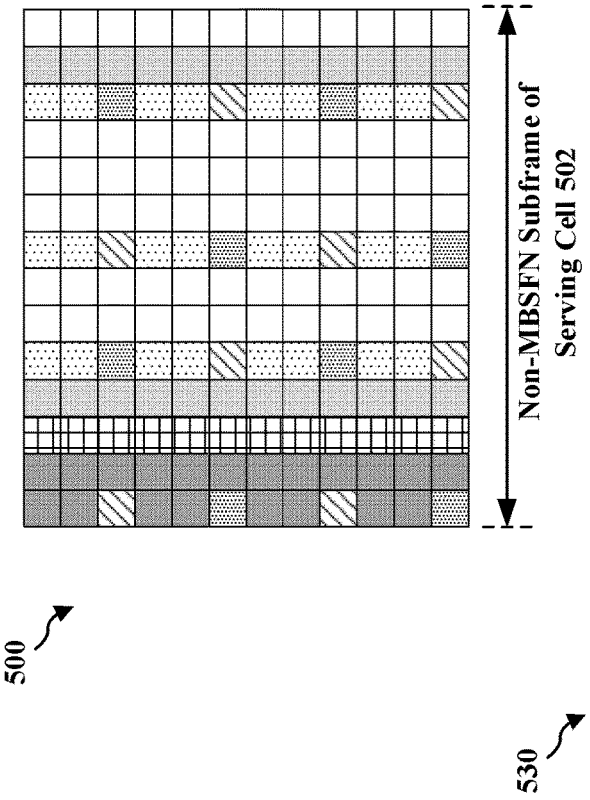
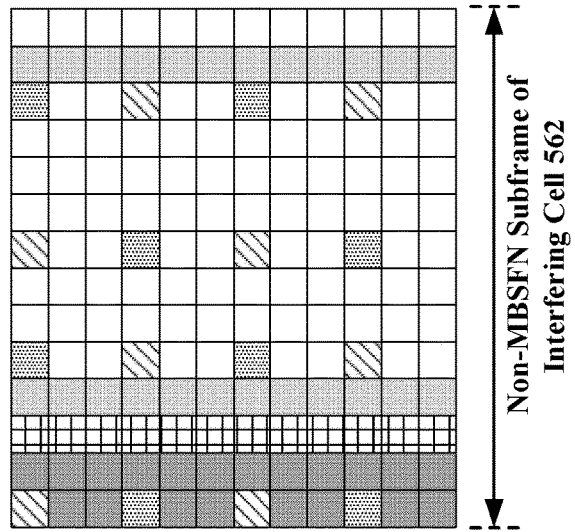
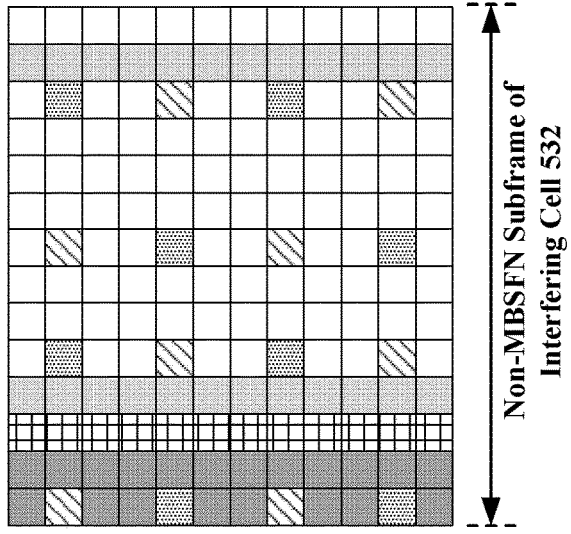
FIG. 5A
FIG. 5B
FIG. 5C

HANDLING CRS INTERFERENCE IN DYNAMIC SPECTRUM SHARING

CROSS REFERENCE TO RELATED APPLICATION(S)

This application is a National Stage Application filed under 35 U.S.C. § 371 of PCT International Application No. PCT/CN2020/113580, entitled "METHODS AND APPARATUS FOR HANDLING CRS INTERFERENCE IN DYNAMIC SPECTRUM SHARING" and filed Sep. 4, 2020, which is expressly incorporated by reference herein in its entirety.

BACKGROUND

Technical Field

The present disclosure relates generally to communication systems, and more particularly, to CRS interference in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc) mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may transmit, to a base station, an interference indication associated with dynamic spectrum sharing (DSS), the interference indication corresponding to a capability of a cell-specific reference signal (CRS) interference cancellation. The apparatus may also receive, from the base station, CRS assistance information associated with the DSS, the CRS assistance information corresponding to one or more interfering cells. The apparatus may also determine, based on the received CRS assistance information, at least one of a location of at least one CRS or a sequence of the at least one CRS, the at least one CRS corresponding to at least one interfering cell of the one or more interfering cells. Additionally, the apparatus may identify the at least one CRS based on at least one of the location of the at least one CRS or the sequence of the at least one CRS. The apparatus may also measure one or more CRSs corresponding to the one or more interfering cells, where the one or more CRSs may include the at least one CRS, the one or more CRSs being measured based on an interference cancellation threshold. The apparatus may also select the at least one CRS based on the interference cancellation threshold. Moreover, the apparatus may mitigate interference from the at least one CRS corresponding to the at least one interfering cell, the interference being mitigated based on at least one of the location of the at least one CRS or the sequence of the at least one CRS. The apparatus may also receive and decode a physical downlink shared channel (PDSCH) from the base station.

In another aspect of the disclosure, a method, a computer-readable medium, and an apparatus are provided. The apparatus may be a base station. The apparatus may receive, from a user equipment (UE), an interference indication associated with dynamic spectrum sharing (DSS), the interference indication corresponding to a capability of a cell-specific reference signal (CRS) interference cancellation. The apparatus may also configure CRS assistance information associated with DSS. The apparatus may also transmit, to the UE, CRS assistance information associated with the DSS, the CRS assistance information corresponding to one or more interfering cells, the CRS assistance information including at least one of a location of at least one CRS or a sequence of the at least one CRS, the at least one CRS corresponding to at least one interfering cell of the one or more interfering cells. Further, the apparatus may encode and transmit a physical downlink shared channel (PDSCH) to the UE. The apparatus may also adjust or switch the at least one CRS based on a movement of the UE. The apparatus may also reconfigure the CRS assistance information via at least one of radio resource control (RRC) signaling, a medium access control (MAC) control element (MAC-CE), or downlink control information (DCI) when the at least one CRS is adjusted or switched.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 5A is a diagram illustrating an example non-MBSFN subframe in accordance with one or more techniques of the present disclosure.

FIG. 5B is a diagram illustrating an example non-MBSFN subframe in accordance with one or more techniques of the present disclosure.

FIG. 5C is a diagram illustrating an example non-MBSFN subframe in accordance with one or more techniques of the present disclosure.

DETAILED DESCRIPTION

Figure 1:
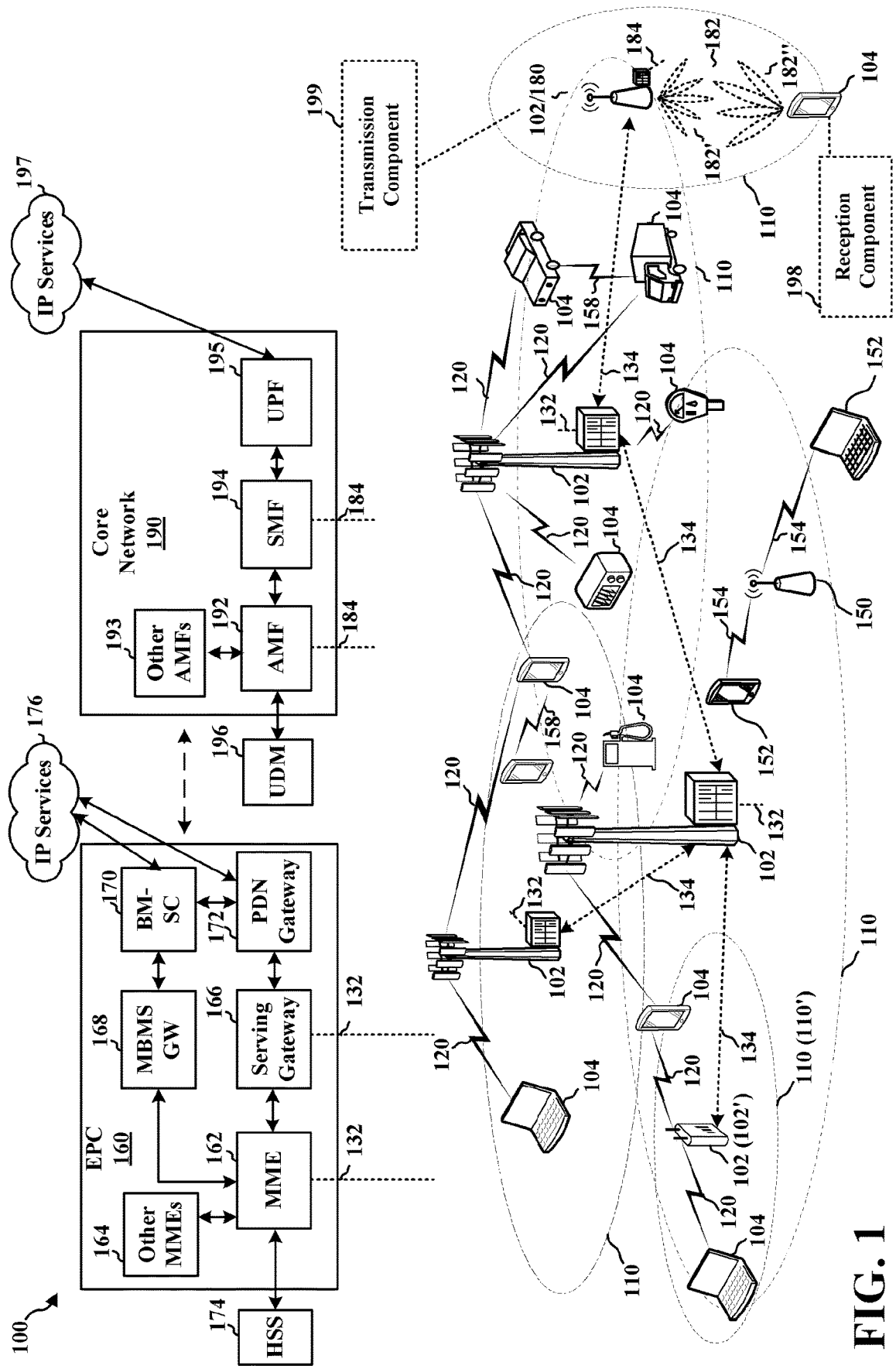
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to transmit, to a base station, an interference indication associated with dynamic spectrum sharing (DSS), the interference indication corresponding to a capability of a cell-specific reference signal (CRS) interference cancellation. Reception component 198 may also be configured to receive, from the base station, CRS assistance information associated with the DSS, the CRS assistance information corresponding to one or more interfering cells. Reception component 198 may also be configured to determine, based on the received CRS assistance information, at least one of a location of at least one CRS or a sequence of the at least one CRS, the at least one CRS corresponding to at least one interfering cell of the one or more interfering cells. Reception component 198 may also be configured to identify the at least one CRS based on at least one of the location of the at least one CRS or the sequence of the at least one CRS. Reception component 198 may also be configured to measure one or more CRSs corresponding to the one or more interfering cells, where the one or more CRSs may include the at least one CRS, the one or more CRSs being measured based on an interference cancellation threshold. Reception component 198 may also be configured to select the at least one CRS based on the interference cancellation threshold. Reception component 198 may also be configured to mitigate interference from the at least one CRS corresponding to the at least one interfering cell, the interference being mitigated based on at least one of the location of the at least one CRS or the sequence of the at least one CRS. Reception component 198 may also be configured to receive and decode a physical downlink shared channel (PDSCH) from the base station.

Referring again to FIG. 1, in certain aspects, the base station 180 may include a transmission component 199 configured to receive, from a user equipment (UE), an interference indication associated with dynamic spectrum sharing (DSS), the interference indication corresponding to a capability of a cell-specific reference signal (CRS) interference cancellation. Transmission component 199 may also be configured to configure CRS assistance information associated with the DSS. Transmission component 199 may also be configured to transmit, to the UE, CRS assistance information associated with the DSS, the CRS assistance information corresponding to one or more interfering cells, the CRS assistance information including at least one of a location of at least one CRS or a sequence of the at least one CRS, the at least one CRS corresponding to at least one interfering cell of the one or more interfering cells. Transmission component 199 may also be configured to encode and transmit a physical downlink shared channel (PDSCH) to the UE. Transmission component 199 may also be configured to adjust or switch the at least one CRS based on a movement of the UE. Transmission component 199 may also be configured to reconfigure the CRS assistance information via at least one of radio resource control (RRC) signaling, a medium access control (MAC) control element (MAC-CE), or downlink control information (DCI) when the at least one CRS is adjusted or switched.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
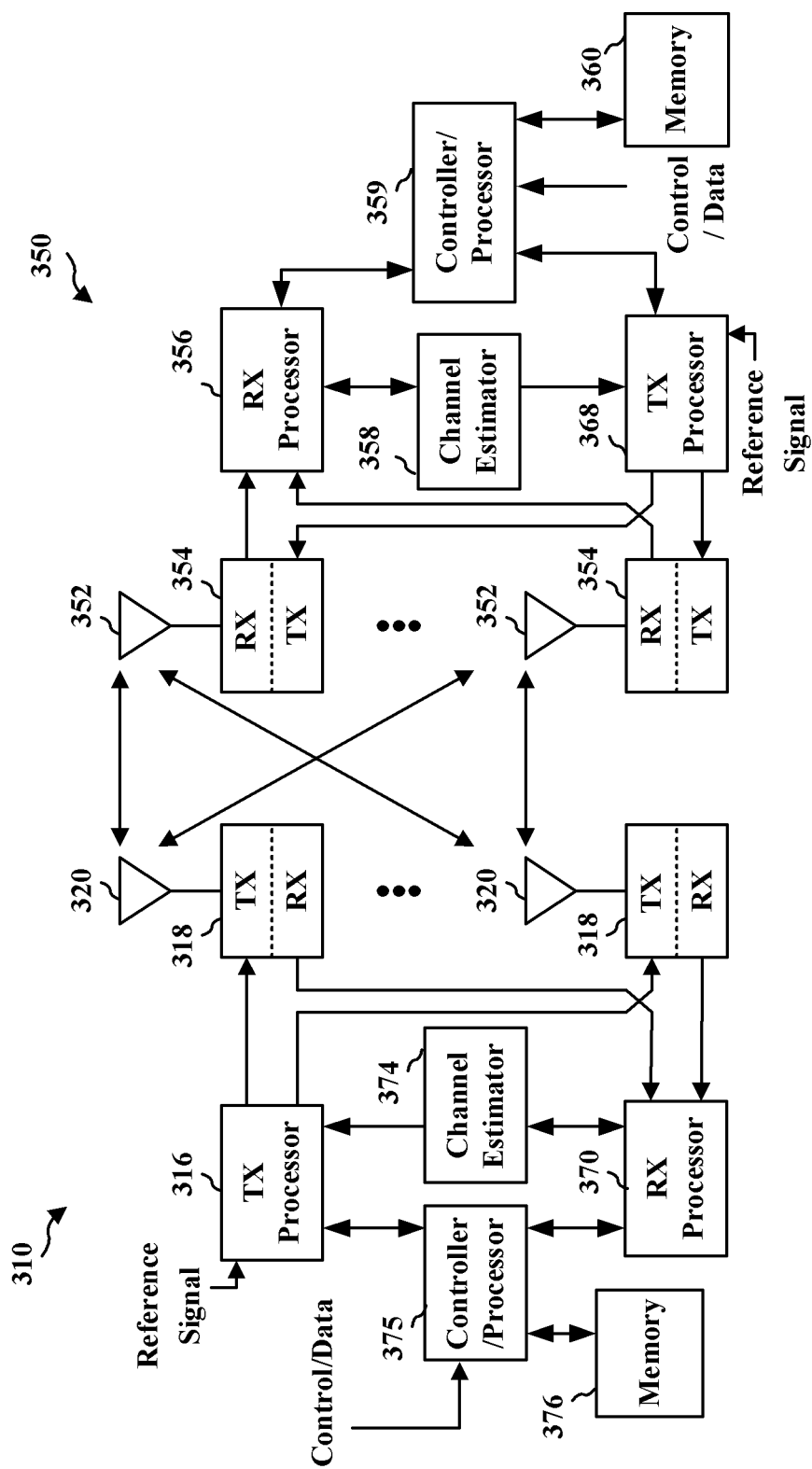
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communication may utilize dynamic spectrum sharing (DSS), which can allow wireless network operators to use the same spectrum bands for different radio access technologies (RATs). The concept of DSS is based on the flexible design of a physical layer, e.g., a new radio (NR) physical layer. DSS may also be associated with the idea that certain signals, e.g., NR signals, are transmitted over unused resources, e.g., LTE resources. Wireless network operators may also utilise DSS as a way to evolve certain wireless networks, e.g., LTE networks, to support other wireless networks, e.g., 5G NR networks.

In some wireless communications, e.g., LTE communications, each of the channels may be statically assigned in the time-frequency domain for each resource element. In other wireless communications, e.g., NR communications, the physical layer may be flexible regarding signals or channels, e.g., reference signals and/or data and control channels. By doing so, this can allow dynamic configurations to minimize a likelihood of collision between different communication technologies, e.g., LTE communications and NR communications.

In some aspects of DSS, certain wireless communication users, e.g., 5G users, may be informed of the presence of DSS, while the functionalities of the other communication devices, e.g., LTE devices, may remain unaffected such that these users may not be aware of the DSS. In some instances, cell-specific reference signal (CRS) rate matching may not be performed with multimedia broadcast single frequency network (MBSFN) subframes. In MBSFN subframes, the first two symbols in the subframe may be utilized in an LTE subframe, and the rest of the symbols may be blank for an LTE signal. By doing so, an NR UE may utilize the remaining symbols in MBSFN for NR transmissions. However, this MBSFN subframe approach may result in a large overhead for LTE UEs.

In some instances, certain data channels, e.g., NR data channels, may be based on cell-specific reference signal (CRS) rate matching in non-MBSFN subframes. In these instances, LTE users may utilize the first two symbols in the subframe for a control channel or PDCCH, e.g., an LTE control channel or LTE PDCCH. Also, the third symbol in the subframe may be utilized for another control channel, e.g., an NR control channel. And the fourth symbol in the subframe may be utilized for a DM-RS for a PDSCH, e.g., an NR DM-RS for a PDSCH. In these instances, the UE may perform a puncturing of REs used by a CRS, e.g., an LTE CRS, so that the scheduler, e.g., an NR scheduler, may determine which REs are not available for data scheduling, e.g., an NR data scheduling, on the PDSCH.

Figure 4:
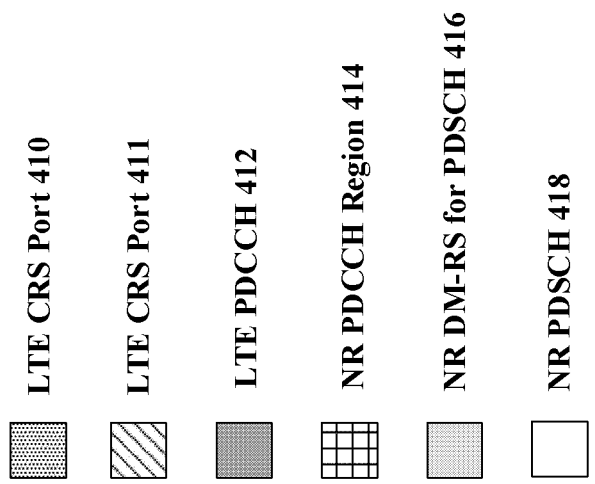
FIG. 4 is a diagram illustrating an example non-multimedia broadcast single frequency network (non-MBSFN) subframe in accordance with one or more techniques of the present disclosure.
Figure 4:
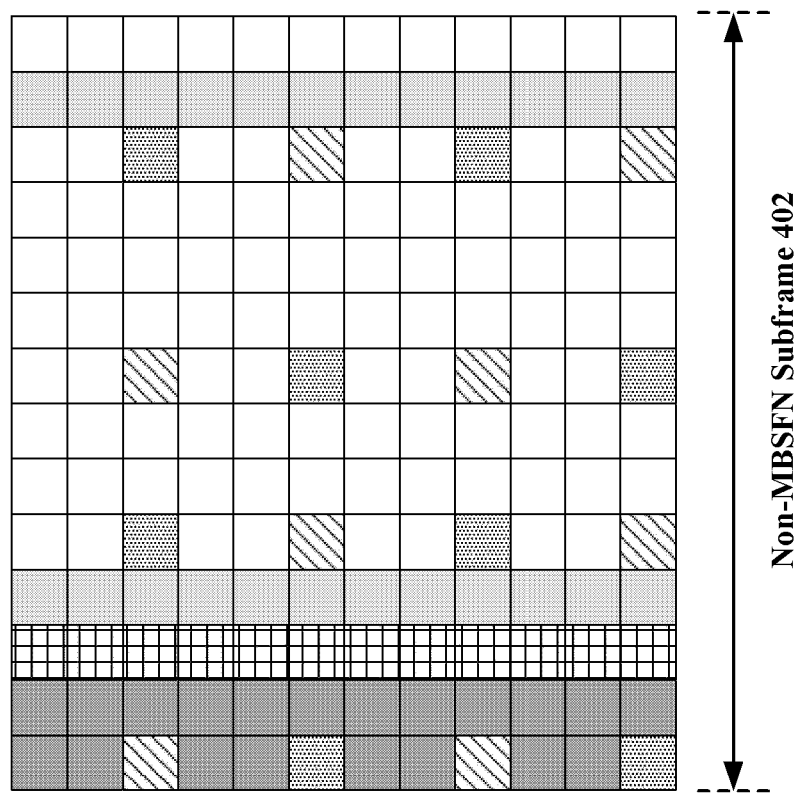

FIG. 4 is a diagram 400 illustrating an example non-multimedia broadcast single frequency network (non-MBSFN) subframe, e.g., non-MBSFN subframe 402. Diagram 400 in FIG. 4 includes a number of symbols and resource elements (REs) in the subframe 402. For example, diagram 400 includes LTE CRS port 410, e.g., port 0, LTE CRS port 411, e.g., port 1, LTE PDCCH 412, NR PDCCH region 414, NR DM-RS for PDSCH 416, and NR PDSCH 418.

As shown in FIG. 4, the first two symbols in subframe 402 may be utilized for LTE control channel or PDCCH 412. The third symbol in subframe 402 may be utilized for an NR control channel or NR PDCCH region 414. Also, the fourth symbol in subframe 402 may be utilized for an NR DM-RS for PDSCH 416. In some instances, LTE CRS REs may remain unchanged. As shown in FIG. 4, NR UEs may perform a puncturing of REs used by an LTE CRS, so that the NR scheduler may determine which REs are not available for NR data scheduling on the PDSCH. Accordingly, the NR PDSCH transmission may be performed on the remaining the REs, e.g., non-LTE CRS REs, such that there may be no collision between the LTE CRS REs and the NR PDSCH.

In some aspects of wireless communications, interference from a cell-specific reference signal (CRS), e.g., an LTE CRS, may degrade PDSCH decoding, e.g., NR PDSCH decoding. For instance, LTE CRS interference may be detrimental for the demodulation of an NR PDSCH. In CRS frequency hopping in certain wireless communications, e.g., LTE communications, the CRS REs of neighboring LTE cells may interfere with an NR PDSCH and degrade the NR PDSCH decoding performance. This has been identified in different field tests.

FIGS. 5A, 5B, and 5C are diagrams 500, 530, and 560, respectively, illustrating example non-MBSFN subframes, e.g., non-MBSFN subframe of serving cell 502, non-MBSFN subframe of interfering cell 532, and non-MBSFN subframe of interfering cell 562. Diagrams 500, 530, and 560 in FIGS. 5A, 5B, and 5C include a number of symbols and REs, which include LTE CRS port 510, e.g., port 0, LTE CRS port 511, e.g., port 1, LTE PDCCH 512, NR PDCCH region 514, NR DM-RS for PDSCH 516, NR PDSCH 518, and NR PDSCH RE interfered by a neighboring LTE CRS 520.

FIG. 5A depicts non-MBSFN subframe for serving cell 502. As shown in FIG. 5A, the first two symbols in subframe 502 may be utilized for LTE control channel or PDCCH 512. The third symbol in subframe 502 may be utilized for an NR control channel or NR PDCCH region 514. Moreover, the fourth symbol in subframe 502 may be utilized for NR DM-RS for PDSCH 516. Further, NR PDSCH RE interfered by neighboring LTE CRS 520 may correspond to symbols 5, 8, and 12. As shown in FIG. 5A, similar to FIG. 4, NR UEs may perform a puncturing of REs used by an LTE CRS. By doing so, the NR scheduler may determine which REs are not available for NR data scheduling on the PDSCH.

FIG. 5B illustrates a non-MBSFN subframe for a first interfering cell 532. As shown in FIG. 5B, the LTE CRS ports 510 and 511 in subframe 532 are offset from the LTE CRS ports 510 and 511 subframe 502 in FIG. 5A. For example, the LTE CRS ports 510 and 511 are in the second row in subframe 532 of the interfering cell, as compared to the third row in subframe 502 of the serving cell. As a result, the decoding performance of the PDSCH may be degraded.

FIG. 5C shows a non-MBSFN subframe for a second interfering cell 562. As displayed in FIG. 5C, the LTE CRS ports 510 and 511 in subframe 562 are offset from the LTE CRS ports 510 and 511 subframe 502 in FIG. 5A. For example, the LTE CRS ports 510 and 511 are in the first row in subframe 562 of the interfering cell, as compared to the third row in subframe 502 of the serving cell. As indicated above, by doing so, the decoding performance of the PDSCH may be degraded.

Additionally, in some instances, CRS interference may be avoided by the transmitter or removed by the receiver. Transmitter or base station techniques for handling CRS interference may avoid REs by muting and/or rate matching the REs for NR PDSCH. However, the overhead for muting the REs may be large and may degrade the NR PDSCH performance. Further, the receiver or UE techniques may rely on a UE processing to eliminate the dominant CRS interference. For example, the interference handling by the UE may be performed via multiple radio access technologies (RATs) or inter-RAT CRS interference cancellation. As indicated herein, inter-RAT communication may be associated with communication between LTE and NR technologies.

In some aspects of wireless communications, e.g., 5G NR communications, UEs may experience an issue when implementing the interference subtraction at the receiver. For example, NR UEs may experience an increased UE complexity because the UE may have to measure each of the potential inter-RAT, e.g., LTE, CRS interference signals from the neighboring cells. Also, the inter-RAT measurements may utilize an increased amount of time to complete an interference measurement from each potential LTE interfering cell. For instance, the UE may need to identify the LTE CRS pattern of each of the aggressor LTE cells. Further, the UE may need to decode the PDSCH from the LTE cell to identify the physical cell ID and the CRS port, as well as the CRS pattern.

Based on the above, it may be beneficial to provide novel procedures for CRS interference cancellation. It may also be beneficial for a UE, e.g., an NR UE, to inform the base station that the NR UE is capable of performing LTE CRS interference cancellation. For instance, it may be beneficial to include LTE CRS interference cancellation that is both inter-RAT and intra-frequency.

Aspects of the present disclosure include novel procedures for CRS interference cancellation, e.g., LTE CRS interference cancellation. For instance, aspects of the present disclosure may include UEs that report a UE capability, e.g., an NR UE capability, to base stations. This UE capability may inform a base station that the UE, e.g., an NR UE, is capable of performing CRS interference cancellation, e.g., LTE CRS interference cancellation, for PDSCH decoding, e.g., NR PDSCH decoding, in DSS.

In some instances, aspects of the present disclosure may utilize a CRS interference cancellation that is inter-RAT or utilizes multiple RATs, e.g., LTE and NR. CRS interference cancellation of the present disclosure may also be intra-frequency. So NR UEs can perform LTE CRS interference cancellation, which may be an inter-RAT CRS interference cancellation. Aspects of the present disclosure may also include signaling, e.g., NR signaling, for performing CRS interference cancellation, e.g., LTE CRS interference cancellation, in DSS.

In some aspects, when a base station receives the UE capability reporting, the base station may send CRS assistance information, e.g., LTE CRS assistance information, of the potential aggressor cells, e.g., LTE cells, to the UE, e.g., an NR UE. By doing so, this can aid the UE, e.g., an NR UE, to mitigate the interference from the CRS, e.g., an LTE CRS, of the aggressor RAT cells, e.g., LTE cells. For each interfering cell, e.g., LTE cell, a number of different CRS assistance information, e.g., LTE CRS assistance information, may be signaled to the UE. For example, the base station may signal to the UE: a physical cell identifier (ID) (PCI), e.g., an LTE PCI, a number of antenna ports of a CRS, e.g., an LTE CRS, and/or an MBSFN subframe configuration, e.g., an LTE MBSFN subframe configuration. As the base station may indicate the MBSFN subframe configuration, the UE can identify which cell may not be needed to perform the interference cancellation. For instance, for MBSFN subframe configurations, indicating REs without a collision between a CRS and a PDSCH, e.g., an LTE CRS and an NR PDSCH, may reduce the complexity of measurement computations.

In some aspects, a UE, e.g., an NR UE, may first determine the location and the sequence of the interfering CRS, e.g., an LTE CRS, based on a physical cell ID, e.g., a physical LTE cell ID, and/or the number of CRS ports of each interfering cell, e.g., LTE cell. After this, the UE may estimate the interfering signal, as well as remove or subtract the interference from the received signal.

Additionally, MBSFN configurations, e.g., LTE MBSFN configurations, may be utilized by the present disclosure, as there may be no CRS, e.g., an LTE CRS, transmitted in the data region in MBSFN subframes, e.g., LTE MBSFN subframes. For instance, the UE may not perform CRS interference cancellation in the MBSFN subframe for PDSCH decoding, e.g., NR PDSCH decoding. Additionally, CRS assistance information may be semi-statically or dynamically indicated by the base station. For example, CRS assistance information, e.g., LTE CRS assistance information, may be semi-statically configured or reconfigured via RRC signaling e.g., NR RRC signaling, or a MAC-CE, e.g., an NR MAC-CE. Further, CRS assistance information may be dynamically indicated via layer 1 (L1) DCI signaling, e.g., NR L1 DCI signaling.

Figure 6:
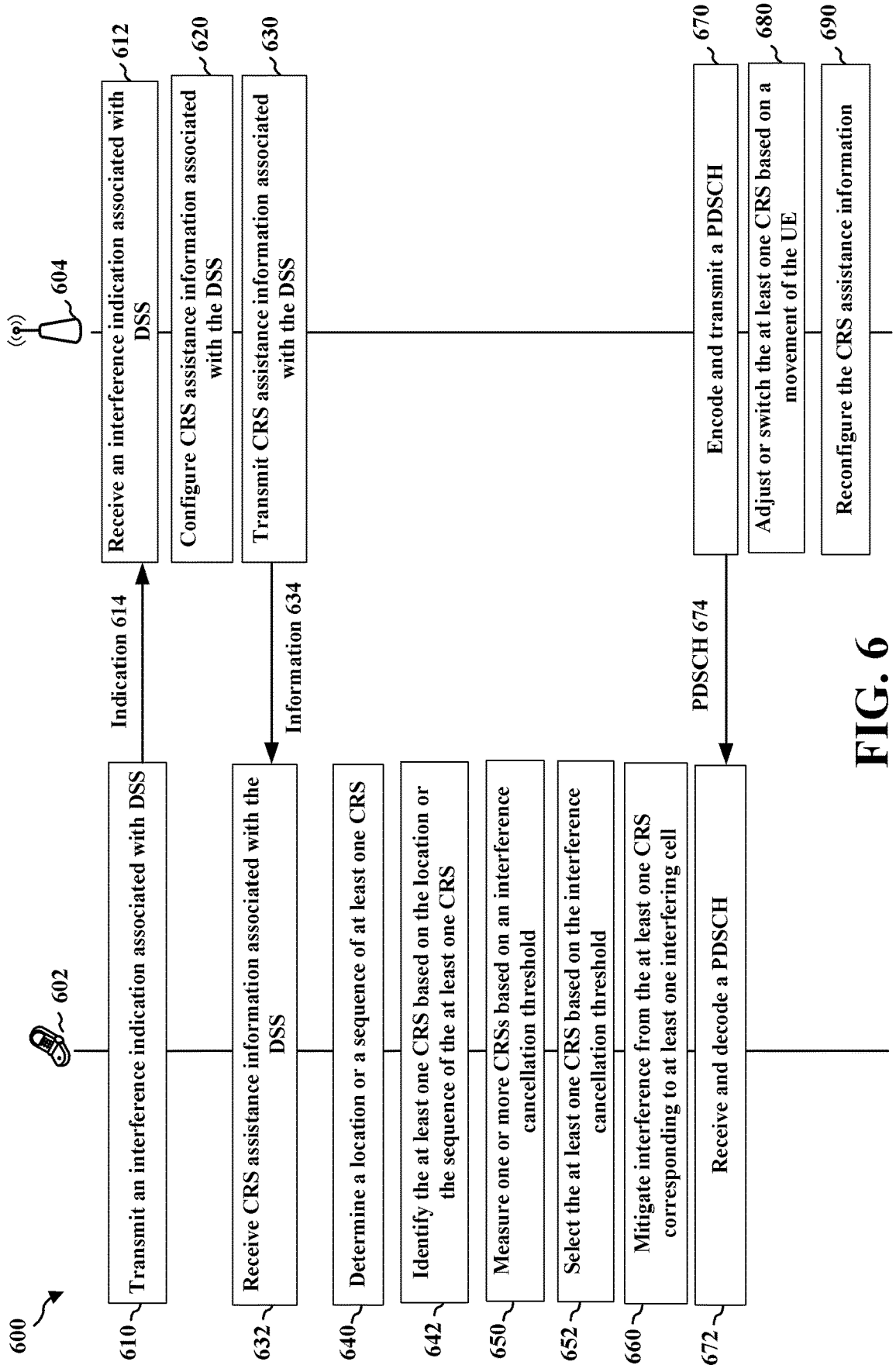
FIG. 6 is a diagram illustrating example communication between a UE and a base station in accordance with one or more techniques of the present disclosure.

FIG. 6 is a diagram 600 illustrating example communication between a UE 602 and a base station 604.

At 610, UE 602 may transmit, to a base station, e.g., base station 604, an interference indication associated with dynamic spectrum sharing (DSS), e.g., indication 614, the interference indication corresponding to a capability of a cell-specific reference signal (CRS) interference cancellation. At 612, base station 604 may receive, from a UE, e.g., UE 602, an interference indication associated with DSS, e.g., indication 614, the interference indication corresponding to a capability of a CRS interference cancellation. In some instances, the DSS may be associated with inter-radio access technology (RAT) communication, the inter-RAT communication including a victim RAT and an aggressor RAT.

At 620, base station 604 may configure CRS assistance information associated with DSS. At 630, base station 604 may transmit, to the UE, e.g., UE 602, CRS assistance information associated with the DSS, e.g., information 634, the CRS assistance information corresponding to one or more interfering cells, the CRS assistance information including at least one of a location of at least one CRS or a sequence of the at least one CRS, the at least one CRS corresponding to at least one interfering cell of the one or more interfering cells. At 632, UE 602 may receive, from the base station, e.g., base station 604, CRS assistance information associated with the DSS, e.g., information 634, the CRS assistance information corresponding to one or more interfering cells. The CRS assistance information may be received via at least one of radio resource control (RRC) signaling, a medium access control (MAC) control element (MAC-CE), or downlink control information (DCI).

In some aspects, the CRS assistance information may include at least one of a physical cell identifier (ID), a number of antenna ports of the at least one CRS, or a multimedia broadcast single frequency network (MBSFN) subframe configuration. Additionally, at least one of the physical cell ID, the number of antenna ports of the at least one CRS, or the MBSFN subframe configuration may be associated with an aggressor radio access technology (RAT).

At least one of the location of the at least one CRS or the sequence of the at least one CRS may be determined based on at least one of the physical cell ID or the number of antenna ports of the at least one CRS.

At 640, UE 602 may determine, based on the received CRS assistance information, at least one of a location of at least one CRS or a sequence of the at least one CRS, the at least one CRS corresponding to at least one interfering cell of the one or more interfering cells.

At 642, UE 602 may identify the at least one CRS based on at least one of the location of the at least one CRS or the sequence of the at least one CRS.

At 650, UE 602 may measure one or more CRSs corresponding to the one or more interfering cells, where the one or more CRSs may include the at least one CRS, the one or more CRSs being measured based on an interference cancellation threshold.

At 652, UE 602 may select the at least one CRS based on the interference cancellation threshold.

At 660, UE 602 may mitigate interference from the at least one CRS corresponding to the at least one interfering cell, the interference being mitigated based on at least one of the location of the at least one CRS or the sequence of the at least one CRS. In some instances, mitigating the interference from the at least one CRS may comprise reducing or subtracting the interference from the at least one CRS.

At 670, base station 604 may encode and transmit a physical downlink shared channel (PDSCH), e.g., PDSCH 674, to the UE. At 672, UE 602 may receive and decode a PDSCH, e.g., PDSCH 674, from the base station. In some aspects, the mitigated interference from the at least one CRS may be associated with the encoded and/or decoded PDSCH. Also, the interference from the at least one CRS may not be mitigated in at least one multimedia broadcast single frequency network (MBSFN) subframe of the encoded and/or decoded PDSCH.

At 680, base station 604 may adjust or switch the at least one CRS based on a movement of the UE, e.g., UE 602. In some instances, the at least one CRS may be adjusted or switched based on a movement of the UE.

At 690, base station 604 may reconfigure the CRS assistance information via at least one of radio resource control (RRC) signaling, a medium access control (MAC) control element (MAC-CE), or downlink control information (DCI) when the at least one CRS is adjusted or switched. Further, the CRS assistance information may be reconfigured via at least one of radio resource control (RRC) signaling, a medium access control (MAC) control element (MAC-CE), or downlink control information (DCI) when the at least one CRS is adjusted or switched.

Figure 7:
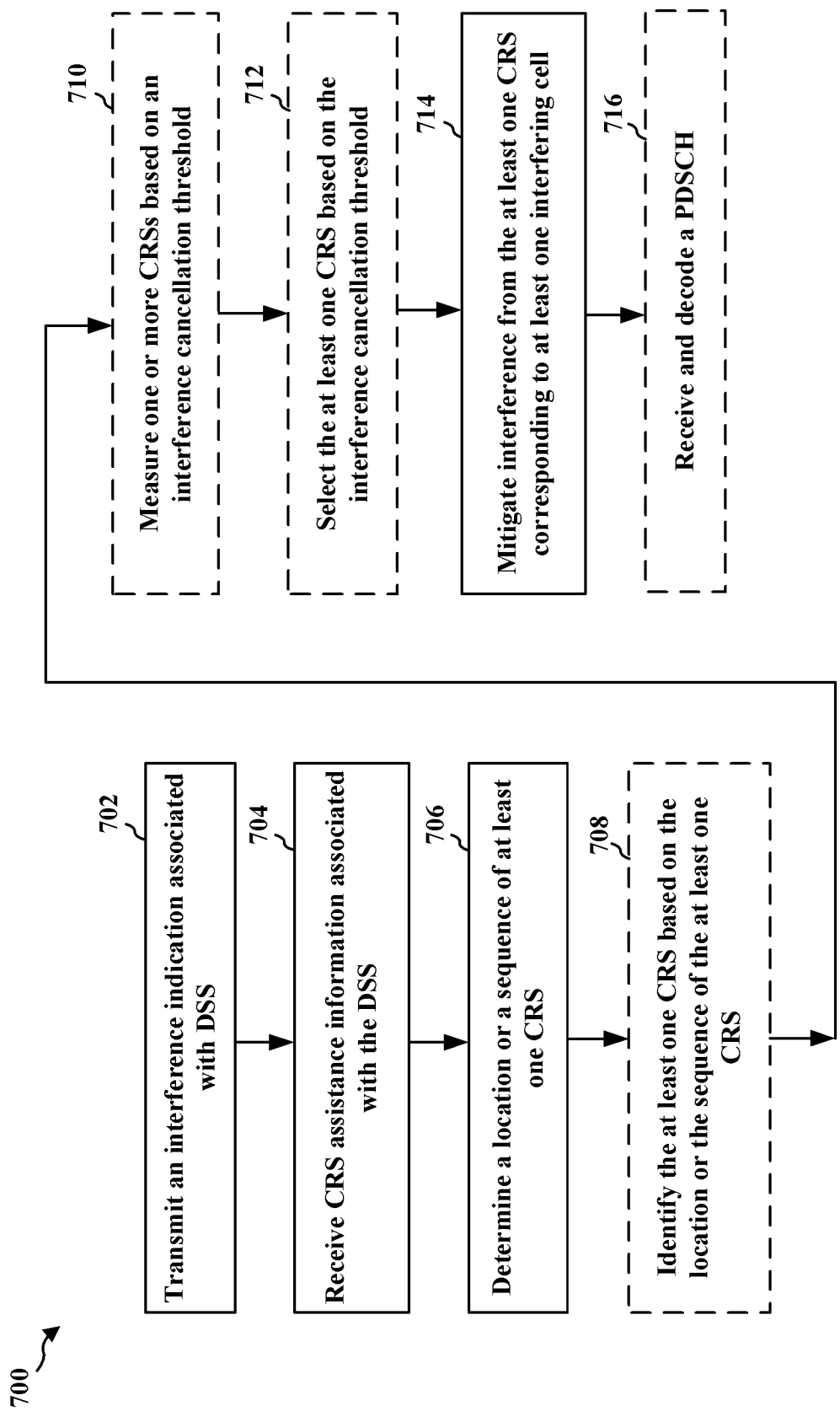
FIG. 7 is a flowchart of a method of wireless communication.

FIG. 7 is a flowchart 700 of a method of wireless communication. The method may be performed by a UE or a component of a UE (e.g., the UE 104, 350, 602; the apparatus 902; a processing system, which may include the memory 360 and which may be the entire UE or a component of the UE, such as the TX processor 368, the controller/processor 359, transmitter 354TX, antenna(s) 352, and/or the like). Optional aspects are illustrated with a dashed line. The methods described herein can provide a number of benefits, such as improving communication signaling, resource utilisation, and/or power savings.

At 702, the apparatus may transmit, to a base station, an interference indication associated with dynamic spectrum sharing (DSS), the interference indication corresponding to a capability of a cell-specific reference signal (CRS) interference cancellation, as described in connection with the examples in FIGS. 4, 5A, 5B, 5C, and 6. For example, 702 may be performed by determination component 940. In some instances, the DSS may be associated with inter-radio access technology (RAT) communication, the inter-RAT communication including a victim RAT and an aggressor RAT, as described in connection with the examples in FIGS. 4, 5A, 5B, 5C, and 6.

At 704, the apparatus may receive, from the base station, CRS assistance information associated with the DSS, the CRS assistance information corresponding to one or more interfering cells, as described in connection with the examples in FIGS. 4, 5A, 5B, 5C, and 6. For example, 704 may be performed by determination component 940. The CRS assistance information may be received via at least one of radio resource control (RRC) signaling, a medium access control (MAC) control element (MAC-CE), or downlink control information (DCI), as described in connection with the examples in FIGS. 4, 5A, 5B, 5C, and 6.

In some aspects, the CRS assistance information may include at least one of a physical cell identifier (ID), a number of antenna ports of the at least one CRS, or a multimedia broadcast single frequency network (MBSFN) subframe configuration, as described in connection with the examples in FIGS. 4, 5A, 5B, 5C, and 6. Additionally, at least one of the physical cell ID, the number of antenna ports of the at least one CRS, or the MBSFN subframe configuration may be associated with an aggressor radio access technology (RAT), as described in connection with the examples in FIGS. 4, 5A, 5B, 5C, and 6. At least one of the location of the at least one CRS or the sequence of the at least one CRS may be determined based on at least one of the physical cell ID or the number of antenna ports of the at least one CRS, as described in connection with the examples in FIGS. 4, 5A, 5B, 5C, and 6.

At 706, the apparatus may determine, based on the received CRS assistance information, at least one of a location of at least one CRS or a sequence of the at least one CRS, the at least one CRS corresponding to at least one interfering cell of the one or more interfering cells, as described in connection with the examples in FIGS. 4, 5A, 5B, 5C, and 6. For example, 706 may be performed by determination component 940.

At 708, the apparatus may identify the at least one CRS based on at least one of the location of the at least one CRS or the sequence of the at least one CRS, as described in connection with the examples in FIGS. 4, 5A, 5B, 5C, and 6. For example, 708 may be performed by determination component 940.

At 710, the apparatus may measure one or more CRSs corresponding to the one or more interfering cells, where the one or more CRSs may include the at least one CRS, the one or more CRSs being measured based on an interference cancellation threshold, as described in connection with the examples in FIGS. 4, 5A, 5B, 5C, and 6. For example, 710 may be performed by determination component 940.

At 712, the apparatus may select the at least one CRS based on the interference cancellation threshold, as described in connection with the examples in FIGS. 4, 5A, 5B, 5C, and 6. For example, 712 may be performed by determination component 940.

At 714, the apparatus may mitigate interference from the at least one CRS corresponding to the at least one interfering cell, the interference being mitigated based on at least one of the location of the at least one CRS or the sequence of the at least one CRS, as described in connection with the examples in FIGS. 4, 5A, 5B, 5C, and 6. For example, 714 may be performed by determination component 940. In some instances, mitigating the interference from the at least one CRS may comprise reducing or subtracting the interference from the at least one CRS, as described in connection with the examples in FIGS. 4, 5A, 5B, 5C, and 6.

At 716, the apparatus may receive and decode a PDSCH from the base station, as described in connection with the examples in FIGS. 4, 5A, 5B, 5C, and 6. For example, 716 may be performed by determination component 940. In some aspects, the mitigated interference from the at least one CRS may be associated with the decoded PDSCH, as described in connection with the examples in FIGS. 4, 5A, 5B, 5C, and 6. Also, the interference from the at least one CRS may not be mitigated in at least one multimedia broadcast single frequency network (MBSFN) subframe of the decoded PDSCH, as described in connection with the examples in FIGS. 4, 5A, 5B, 5C, and 6.

In some instances, the at least one CRS may be adjusted or switched based on a movement of the UE, as described in connection with the examples in FIGS. 4, 5A, 5B, 5C, and 6. Further, the CRS assistance information may be reconfigured via at least one of radio resource control (RRC) signaling, a medium access control (MAC) control element (MAC-CE), or downlink control information (DCI) when the at least one CRS is adjusted or switched, as described in connection with the examples in FIGS. 4, 5A, 5B, 5C, and 6.

Figure 8:
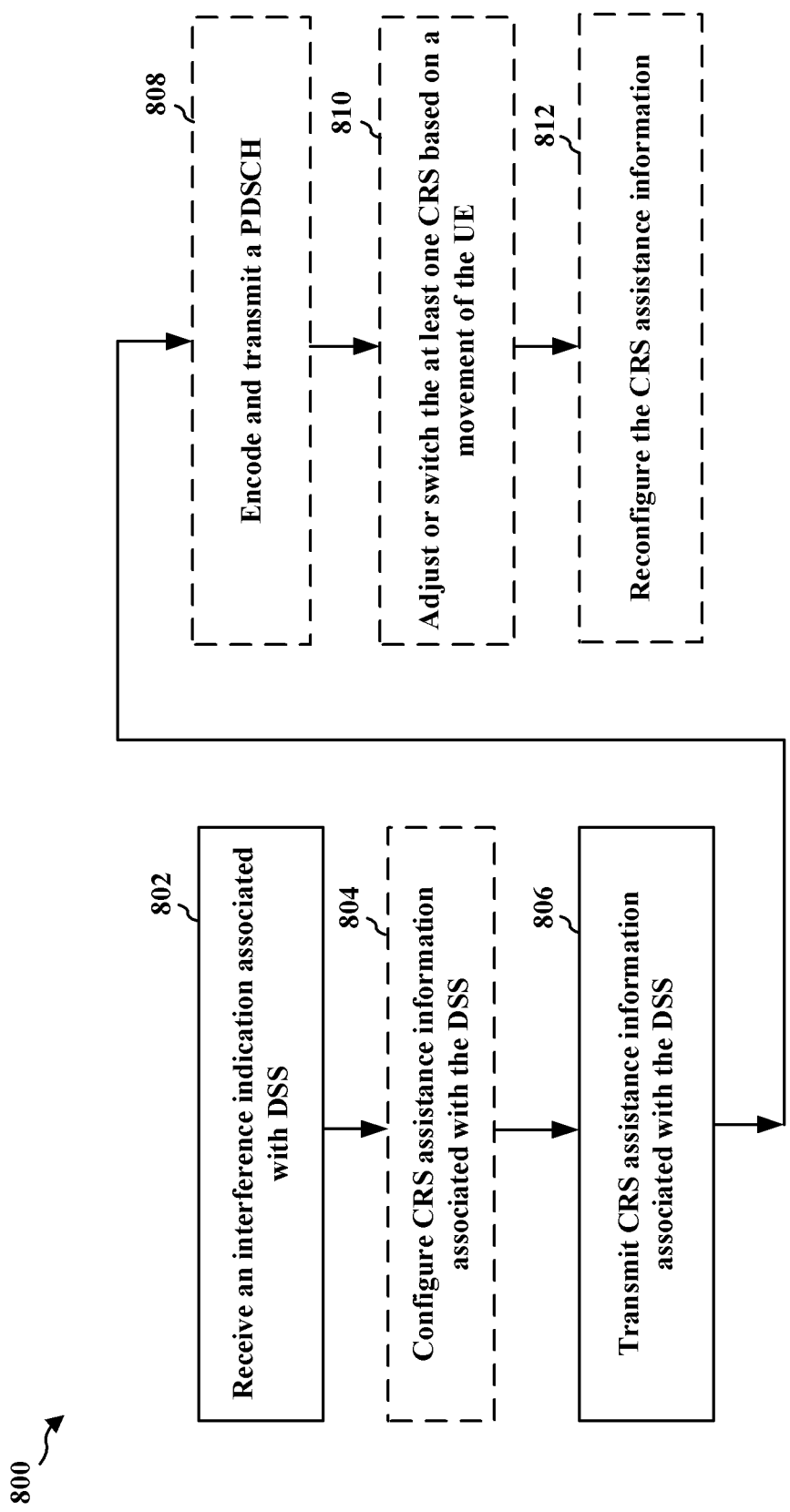
FIG. 8 is a flowchart of a method of wireless communication.

FIG. 8 is a flowchart 800 of a method of wireless communication. The method may be performed by a base station or a component of a base station (e.g., the base station 102, 180, 310, 604; the apparatus 1002; a processing system, which may include the memory 376 and which may be the entire base station or a component of the base station, such as the antenna(s) 320, receiver 318RX, the RX processor 370, the controller/processor 375, and/or the like). Optional aspects are illustrated with a dashed line. The methods described herein can provide a number of benefits, such as improving communication signaling, resource utilisation, and/or power savings.

At 802, the apparatus may receive, from a UE, an interference indication associated with DSS, the interference indication corresponding to a capability of a cell-specific reference signal (CRS) interference cancellation, as described in connection with the examples in FIGS. 4, 5A, 5B, 5C, and 6. For example, 802 may be performed by determination component 1040. The DSS may be associated with inter-radio access technology (RAT) communication, the inter-RAT communication including a victim RAT and an aggressor RAT, as described in connection with the examples in FIGS. 4, 5A, 5B, 5C, and 6.

At 804, the apparatus may configure CRS assistance information associated with DSS, as described in connection with the examples in FIGS. 4, 5A, 5B, 5C, and 6. For example, 804 may be performed by determination component 1040. In some aspects, the CRS assistance information may include at least one of a physical cell identifier (ID), a number of antenna ports of the at least one CRS, or a multimedia broadcast single frequency network (MBSFN) subframe configuration, as described in connection with the examples in FIGS. 4, 5A, 5B, 5C, and 6. At least one of the physical cell ID, the number of antenna ports of the at least one CRS, or the MBSFN subframe configuration may be associated with an aggressor radio access technology (RAT), as described in connection with the examples in FIGS. 4, 5A, 5B, 5C, and 6. Further, at least one of the location of the at least one CRS or the sequence of the at least one CRS may be based on at least one of the physical cell ID or the number of antenna ports of the at least one CRS, as described in connection with the examples in FIGS. 4, 5A, 5B, 5C, and 6.

At 806, the apparatus may transmit, to the UE, CRS assistance information associated with the DSS, the CRS assistance information corresponding to one or more interfering cells, the CRS assistance information including at least one of a location of at least one CRS or a sequence of the at least one CRS, the at least one CRS corresponding to at least one interfering cell of the one or more interfering cells, as described in connection with the examples in FIGS. 4, 5A, 5B, 5C, and 6. For example, 806 may be performed by determination component 1040. The CRS assistance information may be transmitted via at least one of radio resource control (RRC) signaling, a medium access control (MAC) control element (MAC-CE), or downlink control information (DCI), as described in connection with the examples in FIGS. 4, 5A, 5B, 5C, and 6. In some aspects, interference may be mitigated from the at least one CRS based on at least one of the location of the at least one CRS or the sequence of the at least one CRS, as described in connection with the examples in FIGS. 4, 5A, 5B, 5C, and 6. The mitigated interference from the at least one CRS may comprise reduced or subtracted interference from the at least one CRS, as described in connection with the examples in FIGS. 4, 5A, 5B, 5C, and 6.

At 808, the apparatus may encode and transmit a physical downlink shared channel (PDSCH) to the UE, as described in connection with the examples in FIGS. 4, 5A, 5B, 5C, and 6. For example, 808 may be performed by determination component 1040. The mitigated interference from the at least one CRS may be associated with the encoded PDSCH, as described in connection with the examples in FIGS. 4, 5A, 5B, 5C, and 6. Also, the interference from the at least one CRS may not be mitigated in at least one multimedia broadcast single frequency network (MBSFN) subframe of the encoded PDSCH, as described in connection with the examples in FIGS. 4, 5A, 5B, 5C, and 6. In some aspects, one or more CRSs may be measured based on an interference cancellation threshold, the one or more CRSs corresponding to the one or more interfering cells, the one or more CRSs including the at least one CRS, as described in connection with the examples in FIGS. 4, 5A, 5B, 5C, and 6.

At 810, the apparatus may adjust or switch the at least one CRS based on a movement of the UE, as described in connection with the examples in FIGS. 4, 5A, 5B, 5C, and 6. For example, 810 may be performed by determination component 1040.

At 812, the apparatus may reconfigure the CRS assistance information via at least one of radio resource control (RRC) signaling, a medium access control (MAC) control element (MAC-CE), or downlink control information (DCI) when the at least one CRS is adjusted or switched, as described in connection with the examples in FIGS. 4, 5A, 5B, 5C, and 6. For example, 812 may be performed by determination component 1040.

Figure 9:
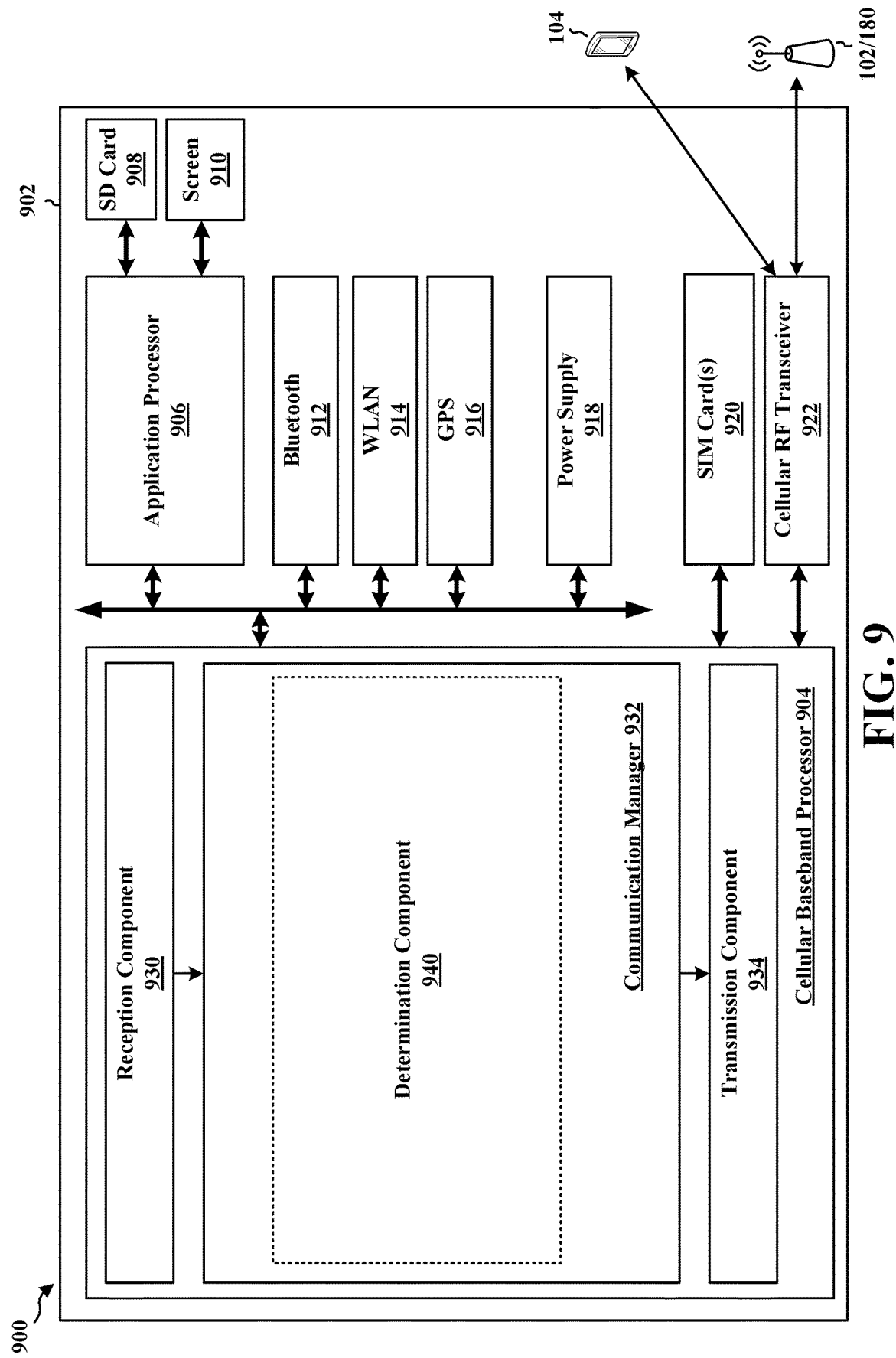
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a determination component 940 that is configured to transmit, to a base station, an interference indication associated with dynamic spectrum sharing (DSS), the interference indication corresponding to a capability of a cell-specific reference signal (CRS) interference cancellation, e.g., as described in connection with step 702 above. Determination component 940 can also be configured to receive, from the base station, CRS assistance information associated with the DSS, the CRS assistance information corresponding to one or more interfering cells, e.g., as described in connection with step 704 above. Determination component 940 can also be configured to determine, based on the received CRS assistance information, at least one of a location of at least one CRS or a sequence of the at least one CRS, the at least one CRS corresponding to at least one interfering cell of the one or more interfering cells, e.g., as described in connection with step 706 above. Determination component 940 can also be configured to mitigate interference from the at least one CRS corresponding to the at least one interfering cell, the interference being mitigated based on at least one of the location of the at least one CRS or the sequence of the at least one CRS, e.g., as described in connection with step 714 above.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for transmitting, to a base station, an interference indication associated with dynamic spectrum sharing (DSS), the interference indication corresponding to a capability of a cell-specific reference signal (CRS) interference cancellation. The apparatus 902 can also include means for receiving, from the base station, CRS assistance information associated with the DSS, the CRS assistance information corresponding to one or more interfering cells. The apparatus 902 can also include means for determining, based on the received CRS assistance information, at least one of a location of at least one CRS or a sequence of the at least one CRS, the at least one CRS corresponding to at least one interfering cell of the one or more interfering cells. The apparatus 902 can also include means for mitigating interference from the at least one CRS corresponding to the at least one interfering cell, the interference being mitigated based on at least one of the location of the at least one CRS or the sequence of the at least one CRS. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
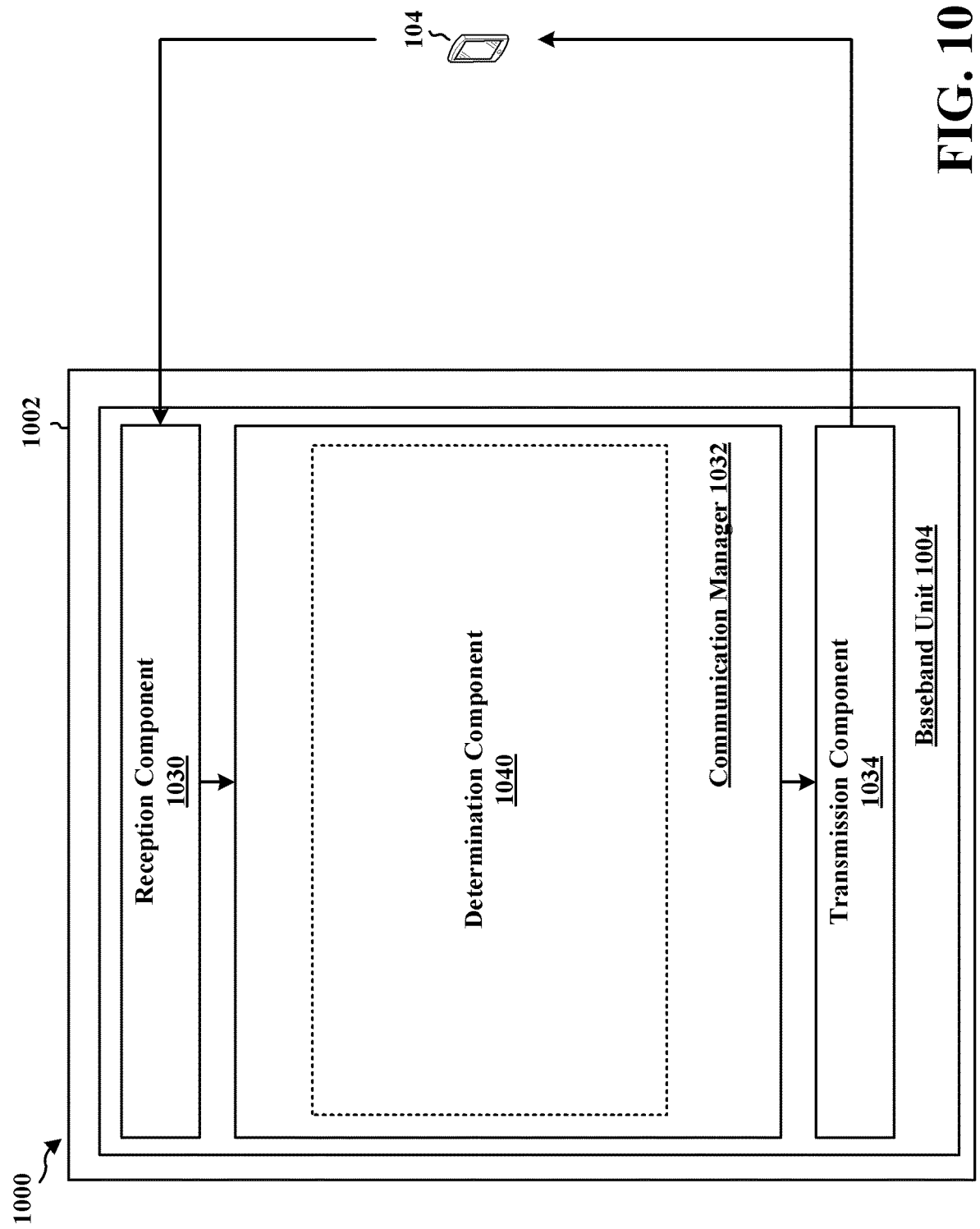
FIG. 10 is a diagram illustrating an example of a hardware implementation for an example apparatus.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a determination component 1040 that is configured to receive, from a UE, an interference indication associated with dynamic spectrum sharing (DSS), the interference indication corresponding to a capability of a cell-specific reference signal (CRS) interference cancellation, e.g., as described in connection with step 802 above. Determination component 1040 can also be configured to transmit, to the UE, CRS assistance information associated with the DSS, the CRS assistance information corresponding to one or more interfering cells, the CRS assistance information including at least one of a location of at least one CRS or a sequence of the at least one CRS, the at least one CRS corresponding to at least one interfering cell of the one or more interfering cells, e.g., as described in connection with step 806 above.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving, from a UE, an interference indication associated with dynamic spectrum sharing (DSS), the interference indication corresponding to a capability of a cell-specific reference signal (CRS) interference cancellation. The apparatus 1002 can also include means for transmitting, to the UE, CRS assistance information associated with the DSS, the CRS assistance information corresponding to one or more interfering cells, the CRS assistance information including at least one of a location of at least one CRS or a sequence of the at least one CRS, the at least one CRS corresponding to at least one interfering cell of the one or more interfering cells. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   transmitting, to a base station, an interference indication associated with dynamic spectrum sharing (DSS), the interference indication corresponding to a capability of an inter-radio access technology (RAT) and intra-frequency cell-specific reference signal (CRS) interference cancellation;
   receiving, from the base station, CRS assistance information associated with the DSS, the CRS assistance information corresponding to one or more interfering cells;
   determining, based on the received CRS assistance information, at least one of a location of at least one CRS or a sequence of the at least one CRS, the at least one CRS corresponding to at least one interfering cell of the one or more interfering cells; and
   mitigating interference from the at least one CRS corresponding to the at least one interfering cell, the interference being mitigated based on at least one of the location of the at least one CRS or the sequence of the at least one CRS.

2. An apparatus for wireless communication at a user equipment (UE), comprising:
   memory; and
   at least one processor coupled to the memory and configured to:
      transmit, to a base station, an interference indication associated with dynamic spectrum sharing (DSS), the interference indication corresponding to a capability of an inter-radio access technology (RAT) and intra-frequency cell-specific reference signal (CRS) interference cancellation;
      receive, from the base station, CRS assistance information associated with the DSS, the CRS assistance information corresponding to one or more interfering cells;
      determine, based on the received CRS assistance information, at least one of a location of at least one CRS or a sequence of the at least one CRS, the at least one CRS corresponding to at least one interfering cell of the one or more interfering cells; and
      mitigate interference from the at least one CRS corresponding to the at least one interfering cell, the interference being mitigated based on at least one of the location of the at least one CRS or the sequence of the at least one CRS.

3. The apparatus of claim 2, wherein the at least one processor is further configured to:
   receive and decode a physical downlink shared channel (PDSCH) from the base station.

4. The apparatus of claim 3, wherein the mitigated interference from the at least one CRS is associated with the decoded PDSCH.

5. The apparatus of claim 3, wherein the interference from the at least one CRS is not mitigated in at least one multimedia broadcast single frequency network (MBSFN) subframe of the decoded PDSCH.

6. The apparatus of claim 2, wherein the CRS assistance information includes at least one of a physical cell identifier (ID), a number of antenna ports of the at least one CRS, or a multimedia broadcast single frequency network (MBSFN) subframe configuration.

7. The apparatus of claim 6, wherein at least one of the physical cell ID, the number of antenna ports of the at least one CRS, or the MBSFN subframe configuration is associated with an aggressor radio access technology (RAT).

8. The apparatus of claim 6, wherein at least one of the location of the at least one CRS or the sequence of the at least one CRS is determined based on at least one of the physical cell ID or the number of antenna ports of the at least one CRS.

9. The apparatus of claim 2, wherein the at least one processor is further configured to:
identify the at least one CRS based on at least one of the location of the at least one CRS or the sequence of the at least one CRS.

10. The apparatus of claim 2, wherein to mitigate the interference from the at least one CRS, the at least one processor is configured to reduce or subtract the interference from the at least one CRS.

11. The apparatus of claim 2, wherein the at least one processor is further configured to:
measure one or more CRSs corresponding to the one or more interfering cells, wherein the one or more CRSs include the at least one CRS, the one or more CRSs being measured based on an interference cancellation threshold.

12. The apparatus of claim 11, wherein the at least one processor is further configured to:
select the at least one CRS based on the interference cancellation threshold.

13. The apparatus of claim 2, wherein to receive the CRS assistance information, the at least one processor is configured to receive the CRS assistance information via at least one of radio resource control (RRC) signaling, a medium access control (MAC) control element (MAC-CE), or downlink control information (DCI).

14. The apparatus of claim 2, wherein the CRS assistance information is reconfigured via at least one of radio resource control (RRC) signaling, a medium access control (MAC) control element (MAC-CE), or downlink control information (DCI) when the at least one CRS is adjusted or switched.

15. The apparatus of claim 2, wherein the DSS is associated with inter-radio access technology (RAT) communication, the inter-RAT communication including a victim RAT and an aggressor RAT.

16. An apparatus for wireless communication at a base station, comprising:
memory; and
at least one processor coupled to the memory and configured to:
receive, from a user equipment (UE), an interference indication associated with dynamic spectrum sharing (DSS), the interference indication corresponding to a capability of an inter-radio access technology (RAT) and intra-frequency cell-specific reference signal (CRS) interference cancellation; and
transmit, to the UE, CRS assistance information associated with the DSS, the CRS assistance information corresponding to one or more interfering cells, the CRS assistance information including at least one of a location of at least one CRS or a sequence of the at least one CRS, the at least one CRS corresponding to at least one interfering cell of the one or more interfering cells;
wherein the transmitted CRS assistance information including at least one of the location of the at least one CRS or the sequence of the at least one CRS is associated with interference mitigation from the at least one CRS.

17. The apparatus of claim 16, wherein the at least one processor is further configured to:
encode and transmit a physical downlink shared channel (PDSCH) to the UE.

18. The apparatus of claim 16, wherein the at least one processor is further configured to:
configure the CRS assistance information associated with the DSS.

19. The apparatus of claim 16, wherein the at least one processor is further configured to:
adjust or switch the at least one CRS based on a movement of the UE.

* * * * *